(12) United States Patent
Ardel et al.

(10) Patent No.: US 11,880,750 B2
(45) Date of Patent: Jan. 23, 2024

(54) ANOMALY DETECTION BASED ON DEVICE VIBRATION

(71) Applicant: SparkCognition, Inc., Austin, TX (US)

(72) Inventors: Alexandru Ardel, Austin, TX (US); Shashank Bassi, Austin, TX (US); Elmira M Bonab, Austin, TX (US); Jeff Brown, Cedar Park, TX (US)

(73) Assignee: SPARKCOGNITION, INC., Austin, TX (US)

( * ) Notice: Subject to any disclaimer, the term of this patent is extended or adjusted under 35 U.S.C. 154(b) by 360 days.

(21) Appl. No.: 16/849,060

(22) Filed: Apr. 15, 2020

(65) Prior Publication Data

US 2021/0326741 A1    Oct. 21, 2021

(51) Int. Cl.
*G06N 20/00* (2019.01)
*G05D 7/06* (2006.01)
*G06N 7/00* (2006.01)
*G06N 7/01* (2023.01)

(52) U.S. Cl.
CPC .......... *G06N 20/00* (2019.01); *G05D 7/0676* (2013.01); *G06N 7/01* (2023.01)

(58) Field of Classification Search
CPC .......... G06N 20/00; G06N 7/005; G06N 3/08; G06N 3/0454; G06N 3/084; G05D 7/0676; G05B 2219/37351; G05B 2219/37434; G05B 23/0254; G01M 99/005; G01M 99/004
See application file for complete search history.

(56) References Cited

U.S. PATENT DOCUMENTS

| | | |
|---|---|---|
| 9,785,495 B1 | 10/2017 | Lazier et al. |
| 10,594,710 B2 | 3/2020 | Wright et al. |
| 10,749,881 B2 | 8/2020 | Tauschinsky et al. |
| 10,776,196 B2 | 9/2020 | Ohana et al. |
| 10,867,250 B2 | 12/2020 | Srinivasan et al. |
| 10,885,239 B2 | 1/2021 | Bak et al. |
| 10,909,322 B1 | 2/2021 | Seow et al. |
| 10,956,808 B1 | 3/2021 | Bhardwaj et al. |
| 11,610,441 B1 | 3/2023 | Bernico |
| 2015/0127595 A1 | 5/2015 | Hawkins et al. |
| 2018/0095004 A1* | 4/2018 | Ide .......... G06N 7/005 |
| 2019/0033843 A1* | 1/2019 | Zhang .......... G01M 99/005 |
| 2020/0117177 A1* | 4/2020 | Cantrell .......... G06N 5/04 |
| 2020/0292608 A1 | 9/2020 | Yan et al. |
| 2020/0311603 A1 | 10/2020 | Qiu et al. |

(Continued)

OTHER PUBLICATIONS

Navarro, Jhonatan, "Robust Structural Damage Detection by Using Statistical Hybrid Algorithms," 2019, pp. 1-106.

(Continued)

*Primary Examiner* — Mohammad W Reza
(74) *Attorney, Agent, or Firm* — Moore IP Law

(57) ABSTRACT

A method of detecting deviation from an operational state of a rotational device includes receiving, from one or more sensor devices coupled to the rotational device, frequency domain data indicative of vibration data sensed during a sensing period. The method also includes processing the frequency domain data using a trained anomaly detection model to generate an anomaly score for the sensing period and processing the anomaly score using an alert generation model to determine whether to generate an alert.

39 Claims, 8 Drawing Sheets

(56) References Cited

U.S. PATENT DOCUMENTS

| | | |
|---|---|---|
| 2020/0333777 A1 | 10/2020 | Maruyama |
| 2020/0379454 A1* | 12/2020 | Trinh .................... G06N 3/088 |
| 2021/0116904 A1 | 4/2021 | Schuster et al. |
| 2021/0264306 A1* | 8/2021 | Baran Pouyan ....... G06N 20/10 |
| 2022/0283057 A1 | 9/2022 | Koizumi et al. |

OTHER PUBLICATIONS

Koizumi, Yuma, et al., "Unsupervised Detection of Anomalous Sound Based on Deep Learning and the Neyman-Pearson Lemma," IEEEACM Transactions on Audio, Speech and Language Processing, vol. 27, No. 1, Jan. 2019, pp. 212-224.

Tobar et al., "Anomaly Detection in Power Generation Plants using Similarity-based Modeling and Multivariate Analysis," 2011 American Control Conference, Jun. 29-Jul. 1, 2011, IEEE, pp. 1940-1945.

\* cited by examiner

ANOMALY DETECTION BASED ON DEVICE VIBRATION

FIELD

The present disclosure is generally related to using trained models to detect and report anomalous behavior of a device based on device vibration.

BACKGROUND

Rotational equipment is commonly monitored via analysis of high frequency vibrational data of the rotational equipment. Conventionally, monitoring the condition of such equipment relies on rules derived from physics-based models. For low-cost equipment that is deployed in large numbers, such as rotational pumps at a water treatment plant or at a petroleum refinery, the operators of the equipment are primarily interested in detection of abnormal versus normal operating states (hereafter referred as binary anomaly detection model). Low-cost assets are often monitored with a single sensor or with small number of sensors. These sensors can be integrated into sensor packages that transform raw time series sensing data into a set of features in the frequency domain.

Deep learning anomaly prediction models are conventionally applied for detecting states of multi-sensor, low-frequency systems and are generally based on reconstruction error, performed in the time domain, of the multi-variate time series. Such models are asset-specific, and their training requires subject matter expertise for the choice of variables, for the calibration of the models, or both. With respect to the calibration of the models, the choice of the thresholds for abnormality versus normality and how to react when these thresholds are exceeded is the topic of complex heuristics and non-trivial trade-offs. The complexity and expertise required to implement asset-specific, deep learning anomaly prediction models renders such approaches unsuitable for monitoring states of low-cost assets that are deployed in large numbers.

SUMMARY

The present disclosure describes systems and methods that enable use of trained models to automatically detect anomalous behavior of devices belonging to the rotational equipment category. Such devices are also referred to herein as "assets." In some implementations, the models can be automatically generated and trained for each particular asset based on historic non-anomalous data for that particular asset. The systems and method described herein process data corresponding to vibration of a particular asset over a series of time windows to determine a series of anomaly scores for the time windows and selectively generate an alert based on statistics associated with the anomaly scores, in accordance with some examples of the present disclosure.

In some aspects, a method of detecting deviation from an operational state of a rotational device starts with receiving raw data from one or more sensor devices coupled to the rotational device, indicative of vibrations on the rotational device. Next, the processed data is derived from frequency analysis (hereafter referred to as frequency domain data) of the raw data. The method extends to processing the frequency domain data using a trained anomaly detection model to generate an anomaly score for the sensing period. The method's final step is processing the anomaly score using an alert generation model to determine whether to generate an alert. In some examples, a method is performed at one or more processors that generate the anomaly score and determine whether to generate the alert based on the frequency domain data received from a sensor package that is coupled to the rotational device.

In some aspects, a system to detect deviation from an operational state of a vibrating device includes a memory including a trained anomaly detection model and an alert generation model. The system also includes one or more processors coupled to the memory. The one or more processors are configured to process, using the trained anomaly detection model, frequency domain data indicative of vibration data sensed during a sensing period. The trained anomaly detection model is configured to generate an anomaly score for the sensing period. The one or more processors are also configured to process the anomaly score using an alert generation model to determine whether to generate an alert.

In some aspect, a computer-readable storage device stores instructions. The instructions, when executed by one or more processors, cause the one or more processors to receive, from one or more sensor devices coupled to a rotational device, frequency domain data indicative of vibration data sensed during a sensing period. The instructions, when executed by one or more processors, also cause the one or more processors to process the frequency domain data using a trained anomaly detection model to generate an anomaly score for the sensing period. The instructions, when executed by one or more processors, further cause the one or more processors to process the anomaly score using an alert generation model to determine whether to generate an alert.

In some aspects, an apparatus for detecting deviation from an operational state of a rotational device includes means for receiving, from one or more sensor devices coupled to the rotational device, frequency domain data indicative of vibration data sensed during a sensing period. The apparatus also includes means for generating an anomaly score for the sensing period based on the frequency domain data and means for determining, based on the anomaly score, whether to generate an alert.

In some aspects, a self-training sensor apparatus includes a sensor to generate sensor data associated with operation of a device and an input interface to receive input to select between a training mode of operation and a detection mode of operation. The apparatus also includes a memory including model generation instructions and one or more processors coupled to the memory. The one or more processors are configured to, while operating in the training mode of operation, receive first sensor data from the sensor and execute the model generation instructions based on the first sensor data to generate a trained anomaly detection model and an alert detection model. The one or more processors are also configured to while operating in the detection mode of operation, receive second sensor data from the sensor, use the trained anomaly detection model to generate an anomaly score, and process the anomaly score using the alert detection model to determine whether to generate an alert. The apparatus further includes an output interface to output an alert indication responsive to the one or more processors generating the alert.

In some aspects, a method of operating a self-training sensor apparatus includes receiving, at an input interface of the self-training sensor apparatus, a first input to select a training mode of operation. The method includes, in response to receiving the first input, receiving, from a sensor of the self-training sensor apparatus, first sensor data associated with operation of a device, and executing, at one or more processors of the self-training sensor apparatus, model generation instructions based on the first sensor data to generate a trained anomaly detection model and an alert detection model.

In some aspects, a computer-readable storage device stores instructions that, when executed by one or more processors, cause the one or more processors to receive, at an input interface of a self-training sensor apparatus, a first input to select a training mode of operation and, in response to receiving the first input, to receive, from a sensor of the self-training sensor apparatus, first sensor data associated with operation of a device, and to execute model generation instructions based on the first sensor data to generate a trained anomaly detection model and an alert detection model.

In some aspects, an apparatus includes means for generating sensor data associated with operation of a device. The apparatus includes means for receiving input to select between a training mode of operation and a detection mode of operation and means for storing model generation instructions. The apparatus also includes means for receiving first sensor data from the means for generating sensor data and generating a trained anomaly detection model and an alert detection model based on the first sensor data while operating in the training mode of operation. The apparatus also includes means for receiving second sensor data from the means for generating sensor data, using the trained anomaly detection model to generate an anomaly score, and processing the anomaly score using the alert detection model to determine whether to generate an alert while operating in the detection mode of operation. The apparatus further includes means for outputting an alert indication responsive to the one or more processors generating the alert.

DETAILED DESCRIPTION

Figure 1:
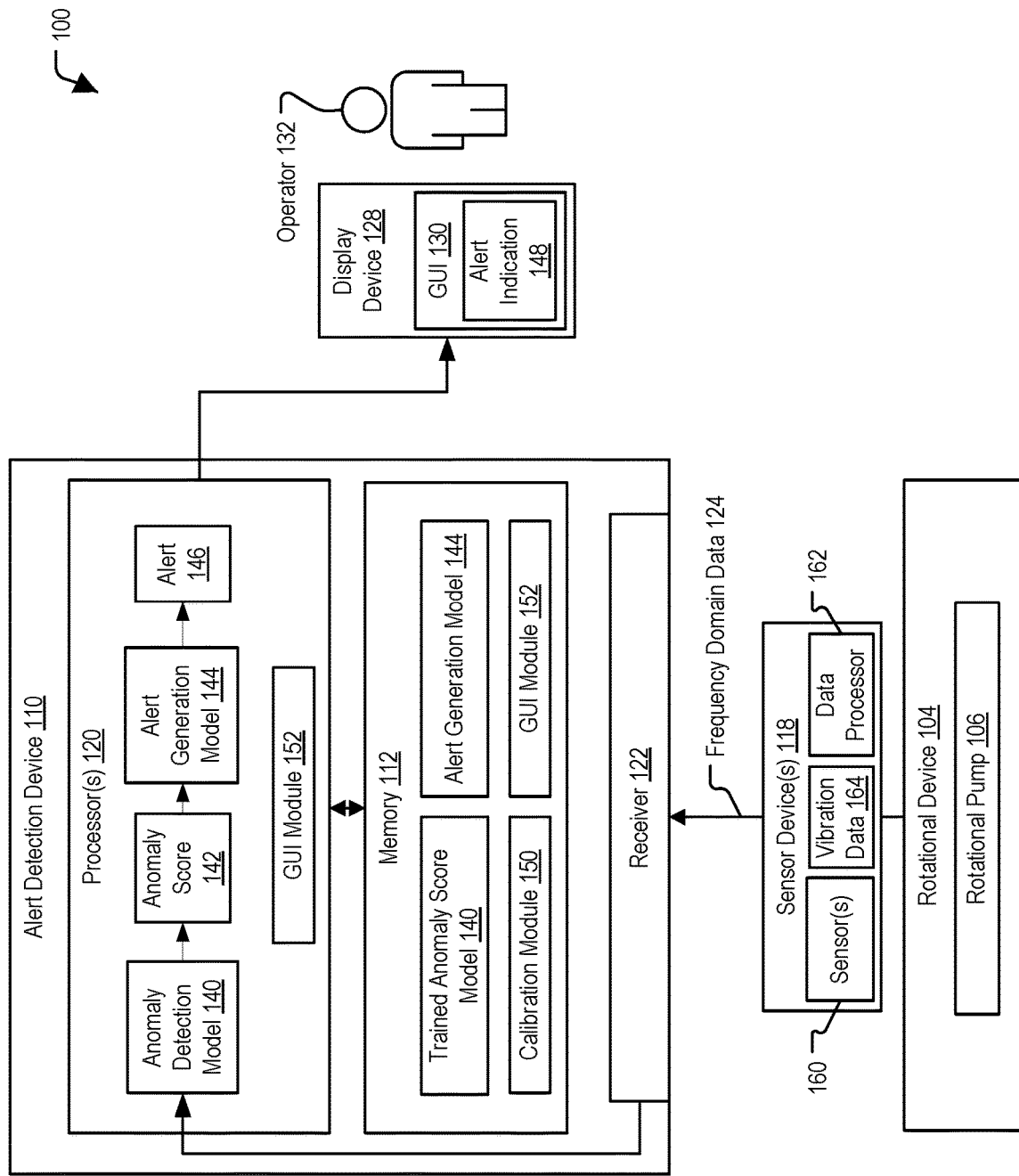
FIG. 1 illustrates a block diagram of a particular implementation of a system that includes a trained anomaly detection model and an alert generation model for detecting anomalous operation of a high frequency rotational device in accordance with some examples of the present disclosure.

Systems and methods are described that enable an automatic generation of asset-agnostic binary anomaly detection models for rotational equipment or other vibrational sources. In some implementations, one such model uses data from one or more identical sensor packages which can be installed on a large number of similar or non-similar assets, such as rotational pumps that are deployed in relatively large numbers.

According to some aspects, a deep learning model for anomaly detection can be easily integrated with high frequency sensor packages deployed for large number of assets. The model may have an architecture that is asset agnostic and that is trained as an asset-specific model using data from a sensor package of the asset. In some implementations, the training process is automatic (i.e., without human intervention other than to initiate the training process). In some aspects, automatic mechanisms are used for determining criteria for generating alarms, based on the severity, persistence, and tolerance for false positives and false negatives for such alarms.

In illustrative implementation, a system includes a pre-processing module for data cleaning, a model generation model, and a post-processing module. The model generation module, such as an autoencoder, operates with sensor data represented in frequency domain. In some examples, normal behavior is characterized by the power of the signal detected by a sensor package being spread between frequency bins in the frequency domain with specific correlations, while abnormal behavior is associated with increasing vibration levels and different signal power distributions between the frequency bins.

According to some aspects, a Hotelling $T^2$ evaluation is performed over multivariate residuals determined by the autoencoder to generate an anomaly score. For a given model parameterization and quality, and apart from the abnormal vs. normal differentiation, the magnitude of the anomaly score is also specific to every asset. For every asset, the statistics of the anomaly score variation over normal behavior is individually learned.

According to some aspects, a sequential probability ratio test (SPRT) provides, for each generated anomaly score, validations or refutations from the hypothesis that the asset behaves abnormally. To illustrate, the SPRT may determine whether or not the Hotelling $T^2$ score follows a different statistics than that of the normal behavior statistics for that particular asset. The SPRT provides an early detection mechanism and supports confidence margins specifications.

According to some aspects, a post-processing module provides a measure of each feature contribution to the Hotelling $T^2$ score. This subset can be inspected by a subject matter expert (SME) for further analysis and possible remedial actions regarding the asset.

Thus, the described systems and methods address a significant challenge in deploying machine learning-based models at scale (e.g., individual models for a large number of assets). Techniques described herein, such as using models that are specific to a particular sensor pack and that primarily differentiate between normal and abnormal operation, enable a unique anomaly detection model to be created for an asset using a specific, common sensor pack without any human intervention. As a result, the described systems and methods can provide cost-beneficial machine-learning models for relatively large numbers of lower-cost assets that are not identical, such as pumps at an industrial plant.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

FIG. 1 depicts a system 100 to detect abnormal operation of a vibrating device. The system 100 includes one or more sensor devices 118 coupled to a high frequency rotational device 104, such as a pump 106. As used herein, a "rotational device" or a "rotary device" refers to a device that includes a component that rotates or spins during operation, such as an impeller, propeller, or flywheel; examples of rotational devices and rotary devices include, but are not limited to, pumps, compressors, turbines, generator, blowers, fans, electric motors, and gearboxes. An alert detection device 110 is coupled to the one or more sensor devices 118 and to a display device 128. The alert detection device 110 includes a receiver 122 and a memory 112 that are coupled to one or more processors 120. In various implementations, the alert detection device 110 is configured to determine, using a trained anomaly detection model 140 that is specific to the rotational device 104, whether the rotational device 104 is operating normally or abnormally and to selectively provide an alert indication 148 to an operator 132 (e.g., a technician or SME), as described further below.

In some implementations, the memory 112 includes volatile memory devices, non-volatile memory devices, or both, such as one or more hard drives, solid-state storage devices (e.g., flash memory, magnetic memory, or phase change memory), a random access memory (RAM), a read-only memory (ROM), one or more other types of storage devices, or any combination thereof. The memory 112 stores data and instructions (e.g., computer code) that are executable by the one or more processors 120. For example, the instructions can include one or more trained models (e.g., trained machine learning models) that are executable by the one or more processors 120 to initiate, perform, or control various operations of the alert detection device 110. For example, the one or more trained models can include autoencoders, such as described further with reference to FIG. 2. As illustrated, the memory 112 includes the trained anomaly detection model 140, an alert generation model 144, a calibration module 150, and a graphical user interface (GUI) module 152.

The one or more processors 120 include one or more single-core or multi-core processing units, one or more digital signal processors (DSPs), one or more graphics processing units (GPUs), or any combination thereof. The one or more processors 120 are configured to receive, via the receiver 122, data in the frequency domain 124 (also referred to as "frequency domain data" 124) corresponding to the rotational device 104 and indicative of vibration data 164 sensed during a sensing period. The one or more processors 120 are configured to process the frequency domain data 124 using the trained anomaly detection model 140, and the trained anomaly detection model 140 is configured to generate an anomaly score 142 for each sensing period. The one or more processors 120 are also configured to process the anomaly score 142 using the alert generation model 144 to determine whether to generate an alert 146. An example implementation of the anomaly detection model 140 and the alert generation model 144 is described in further detail with reference to FIG. 2.

The GUI module 152 is executable by the one or more processors 152 to generate a graphical user interface 130 to display an alert indication 148. For example, the GUI module 152 may be executed by the one or more processors 152 to display the GUI 130 at the display device 128 to provide the operator 132 with the alert indication 148. The GUI 130 may provide additional information related to the alert 146, such as described further with reference to FIG. 5.

The one or more sensor devices 118, also referred to as a "sensor package," are coupled to a rotational device 104 and include one or more sensors 160 and a data processor 162. The one or more sensors 160 are configured to generate the vibration data 164. The data processor 162 is configured to output data in the frequency domain ("frequency domain data") 124 based on the vibration data 164. In an illustrative example, the data processor 162 is configured to apply a transform (e.g., a fast Fourier transform) to the time-series vibration data 164 and generate the frequency domain data 124 indicating power distribution across multiple frequency bands of the vibration data.

The receiver 122 is configured to receive the frequency domain data 124 from the one or more sensor devices 118. In an example, the receiver 122 includes a bus interface, a wireline network interface, a wireless network interface, or one or more other interfaces or circuits configured to receive the frequency domain data 124 via wireless transmission, via wireline transmission, or any combination thereof.

During operation, the sensor device 118 measures the vibration data 164, such as a time series of motion measurements from the one or more sensors 160, corresponding to normal operation of the rotational device 104. For each sensing period (e.g., each frame or time segment of the vibration data 164, such as a 1 second time segment), the data processor 162 generates a corresponding value of the frequency-domain features data, and a time series of the frequency-domain feature data is provided (e.g., streamed) to the alert detection device 110 as the frequency domain data 124.

The alert detection device 110 may be calibrated to perform normal/abnormal operation detection for the specific rotational device 104 via execution of the calibration module 150. For example, execution of the calibration module 150 may be initiated via an input from the operator 132, such as via the GUI 130 or via another input device (as described further with reference to FIG. 4). During calibration, the one or more processors 120 may retrieve an anomaly detection model from the memory 112 that is configured for use with the sensor device 118 but that is not trained for the specific rotational device 104. The frequency domain data 124 is used as training data to train the anomaly detection model retrieved from the memory 112 to generate the trained anomaly detection model 140. The trained anomaly detection model 140 is used in conjunction with the frequency domain data 124 to generate additional calibration data, such as statistics regarding the distribution of anomaly scores 142 during normal operation. Additional details regarding model calibration are provided with reference to the example of FIG. 3.

After calibration, the alert detection device 110 continues processing the received frequency domain data 124 to detect changes in the operation of the rotational device 104 and to generate the alert 146 responsive to the alert generation model 144. Various statistics associated with the frequency domain data 124 may slowly shift over time as the rotational device 104 ages, and in some implementations the alert detection device 110 is configured to periodically or continually update models or statistics corresponding to normal operation of the rotational device 104 to accommodate such gradual changes in normal behavior.

Thus, the system 100 enables distribution of a machine-learning type model that can be automatically trained for an individual asset (e.g., the specific rotational device 104) to distinguish between normal and abnormal operation and to generate an alert in response to detection of abnormal operation. More generally, the system 100 enables detection of deviation from an operating state of the asset, such as detecting a transition from a first distinct operating state (e.g., the "normal" state to which the model is trained) to a second distinct operating state (e.g., the "abnormal" state). The second operating state, although distinct from the first operating state, may also be a "normal" operating state that is not associated with a malfunction or fault of the asset. Multiple instances of the sensor devices 118 and the alert detection device 110 can be deployed at low cost to process the frequency domain data 124 for a large number of assets, such as via wireless transmissions from the sensor devices 118 to a central server facility or cloud-based computing service. As a result, machine-learning monitoring of a large number of relatively inexpensive assets can be deployed in a cost-effective manner.

In addition, using separate models for determining a risk score (e.g., the anomaly score) and for determining whether to generate an alert allows for on-delays, off-delays, and dynamic alerting. For example, even though the anomaly score may have a value indicative of an alert zone, the alert model may decide not to raise an alert immediately. To illustrate, if a sequence of anomaly scores exhibits a gradual departure from their distribution observed during the normal operation mode, the anomaly detection model may not immediately raise an alert until receiving additional anomaly scores. In contrast, if another sequence of anomaly scores departs rapidly from the distribution observed during a normal operation mode the anomaly detection model may immediately raise an alert in response to that short sequence of anomaly scores.

Although FIG. 1 depicts the display device 128 as coupled to the alert detection device 110, in other implementations the display device 128 is integrated within the alert detection device 110. Although the display device 128 is illustrated as providing the alert indication 148 via the GUI 130 at the display device 128, in other implementations the alert indication 148 may alternatively, or additionally, be provided via one or more other mechanisms, such as an output interface that includes at least one of a light, a buzzer, or a signal port, as described further with reference to FIG. 4. In some implementations, functionality corresponding to the sensor device 118 and the alert detection device 110 are integrated into a single device, such as within a common housing, as described in further detail with reference to FIG. 4.

Figure 2:
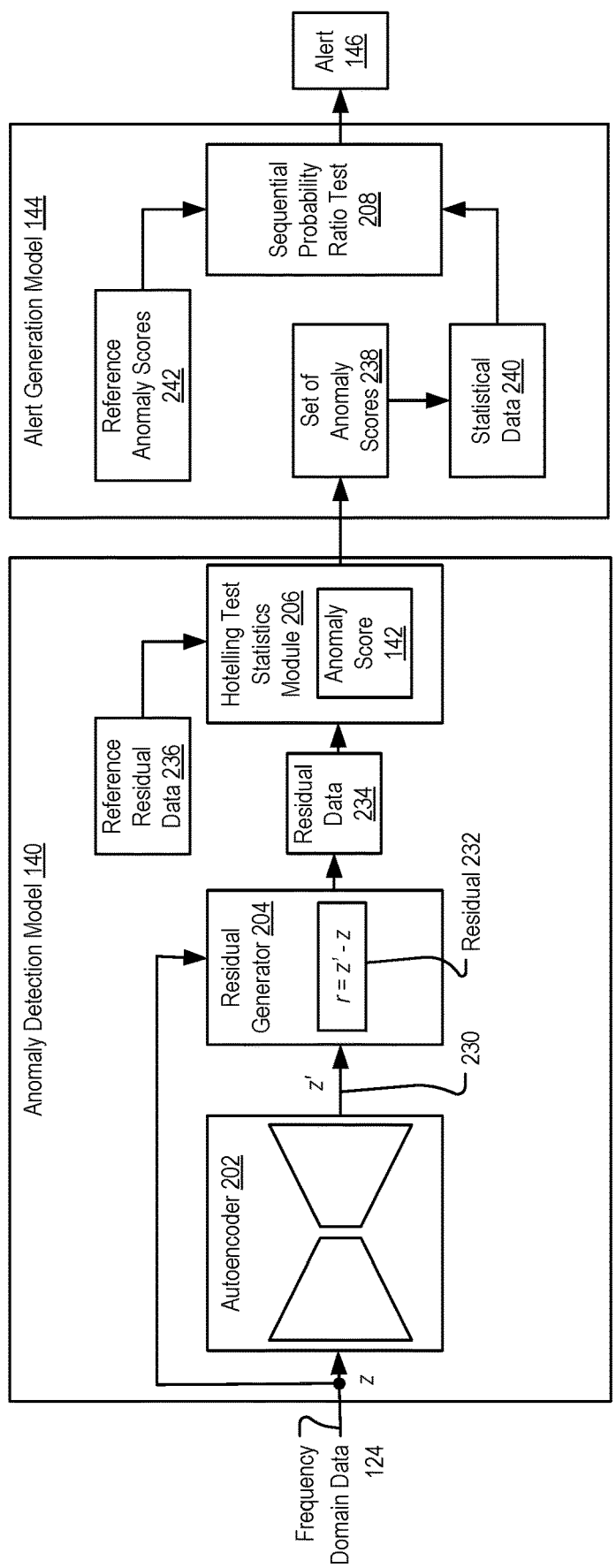
FIG. 2 is a block diagram of components that may be included in the system of FIG. 1 in accordance with some examples of the present disclosure.

FIG. 2 depicts a block diagram 200 of a particular implementation of components that may be included in the alert detection device 110 of FIG. 1. As illustrated, the trained anomaly detection model 140 includes an autoencoder 202, a residual generator 204, and a Hotelling test statistics module 206 (also referred to as "Hotelling module" 206).

The autoencoder 202 is configured to generate a reconstruction 230 (denoted as z') of the frequency domain data 124 (denoted as z). In an illustrative example, the autoencoder 202 is an unsupervised neural network that includes an encoder portion to compress an input to a latent space (e.g., a layer that contains a compressed representation of the input), and a decoder portion to reconstruct the input from the bottleneck to generate the reconstruction 230. The autoencoder 202 can be trained via backpropagation to reduce or minimize a reconstruction error between the frequency domain data 124 and the resulting reconstructions 230 of the training data.

The residual generator 204 is configured to generate a residual 232 (denoted as r) based on a difference between the reconstruction 230 and the input data 124. To illustrate, the residual can be determined according to r=z'−z. In implementations in which\ the input data 124 and the reconstruction 230 are multivariable (e.g., a set of multiple values, with each value representing a power level for a corresponding frequency band), the residual 232 is also multivariable.

The Hotelling test statistics module 206 is configured to generate the anomaly score 142 based on the residual 232 and a reference residual data 236. For example, the Hotelling test statistics module 206 may implement a Hotelling $T^2$ (or "T-squared") test statistics that computes an anomaly score 142:

$$t^2 = \frac{n_x n_y}{n_x + n_y}(\bar{x} - \bar{y})'\hat{\Sigma}^{-1}(\bar{x} - \bar{y}) \sim T^2(p, n_x + n_y - 2),$$

where $\bar{x}$ and $\bar{y}$ are the sample means of samples drawn from two multivariate distributions (e.g., normal/reference residuals and new/test residuals) given as $$\bar{x} = \frac{1}{n_x}\sum_{i=1}^{n_x} x_i \text{ and } \bar{y} = \frac{1}{n_y}\sum_{i=1}^{n_y} y_i,$$

with respective sample covariance matrices of $$\hat{\Sigma}_x = \frac{1}{n_x - 1}\sum_{i=1}^{n_x}(x_i - \bar{x})(x_i - \bar{x})' \text{ and}$$

$$\hat{\Sigma}_y = \frac{1}{n_y - 1}\sum_{i=1}^{n_y}(y_i - \bar{y})(y_i - \bar{y})',$$

(where an apostrophe (') denotes transpose), where $$\hat{\Sigma} = \frac{(n_x - 1)\hat{\Sigma}_x + (n_y - 1)\hat{\Sigma}_y}{(n_x + n_y - 2)}$$

is the unbiased pooled covariance matrix estimate, and where $T^2$ (p, m) is Hotelling's T-squared distribution with dimensionality parameter p and m degrees of freedom. Larger $T^2$ values indicate greater deviation from the expected values and therefore greater likelihood that there is a statistical difference between the residual data 234 and the normal operation indicated in the reference residual data 236.

The alert generation model 144 includes a sequential probability ratio test (SPRT) 208 configured to selectively generate the alert 146 based on statistical data 240 corresponding to a set of anomaly scores 238 (e.g., a sequence or stream of anomaly scores 142) that includes the anomaly score 142 and further based on reference anomaly scores 242. For example, the SPRT 208 is a sequential hypothesis test that provides continuous validations or refutations of the hypothesis that the rotational device 104 behaves abnormally, by determining whether the anomaly score 142 (e.g., the $T^2$ score) continues to follow, or no longer follows, the normal behavior statistics of the reference anomaly scores 242. In some implementations, the reference anomaly scores 242 include data indicative of a distribution of reference anomaly scores (e.g., mean and variance) instead of, or in addition to, the actual values of the reference anomaly scores. The SPRT 208 provides an early detection mechanism and supports tolerance specifications for false positives and false negatives.

Figure 3:
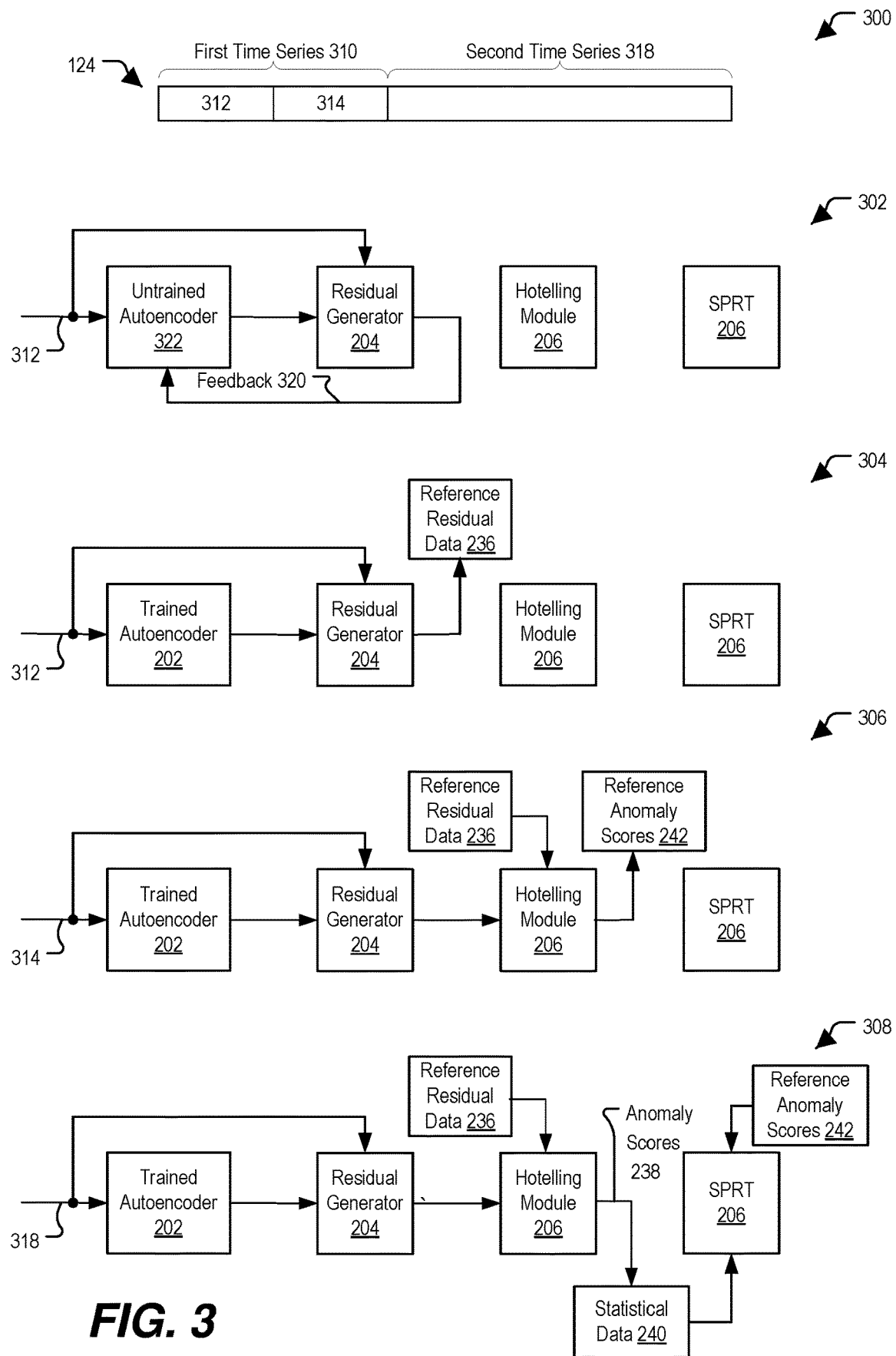
FIG. 3 is a block diagram of initialization stages that may be used for the system of FIG. 1 in accordance with some examples of the present disclosure.

FIG. 3 depicts a series of stages 300-308 of calibration and operation of the components depicted in FIG. 2. In a first stage 300, the sensor device 118 initiates output of a stream of the frequency domain data 124 that is partitioned into a first time series 310 of frequency domain data followed by a second time series 318 of the frequency domain data. The first time series 310 represents normal operation of the asset (e.g., the rotational pump 106) and is used as training data to perform calibration of one or more machine-learning models and to generate reference residual data and anomaly score data, and the second time series 318 is used to monitor operation of the asset using the calibrated models.

In a second stage 302, an untrained autoencoder 322 is trained using a first portion 312 of the first time series 310 which is indicative of normal operation of the rotational device 104. For example, residuals calculated by the residual generator 204 can be used to generate feedback 320, and the untrained autoencoder 322 can be adjusted (e.g., via backpropagation) to reduce an amount of error in generating a reconstruction of the input data (e.g., to minimize an L2 norm associated with the residual values). To illustrate, the autoencoder 202 may be trained until an average residual magnitude over the training data is less than a threshold amount. As an illustrative, non-limiting example, the first portion 312 that is used for training the autoencoder can correspond to 50,000 samples.

In a third stage 304, reference residual data 236 is stored based on outputs of the trained autoencoder 202 responsive to the first portion 312 of the first time series 310. For example, the reference residual data 236 can include storage of residual values calculated based on processing the first portion 312 during the training of the autoencoder 202. As an alternative to storing the residual values, or in addition, the reference residual data 236 can include statistical data (e.g., mean and covariance matrix) associated with the residual values corresponding to the first portion 312.

In a fourth stage 306, reference anomaly scores 242 are generated based on the reference residual data 236 and residual scores associated with a second portion 314 of the first time series 310. As an illustrative, non-limiting example, a first 100 samples of the second portion 314 may be processed by the autoencoder 202 and used to generate 100 residuals. These 100 residuals (e.g., statistical data associated with these residuals) are compared to the reference residual data 236 by the Hotelling test statistics module 206 to generate a first reference anomaly score. Each successive 100 samples of the second portion 314 may be processed to generate another reference anomaly score, until a sufficiently large number of anomaly scores have been generated (e.g., 5,000 $T^2$ scores, as a non-limiting example). The resulting reference anomaly scores 242 (e.g., the actual scores, the mean and variance of the scores, or both) are stored for use by the SPRT 208.

In a fifth stage 308, monitoring of the rotational device 104 is performed using the second time series 318. The Hotelling test statistics module 206 uses the reference residual data 236 to generate the anomaly scores 238 by comparing distributions of residuals received from the residual generator 204 to the reference residual data 236. The SPRT 208 uses the reference anomaly scores 242 (e.g., the known distribution of $T^2$ scores from training) and the statistical data 240 corresponding to the anomaly scores 238 to determine whether to issue an alert based on the likelihood that the statistical data 240 represents a shift from the reference anomaly scores 242.

Figure 4:
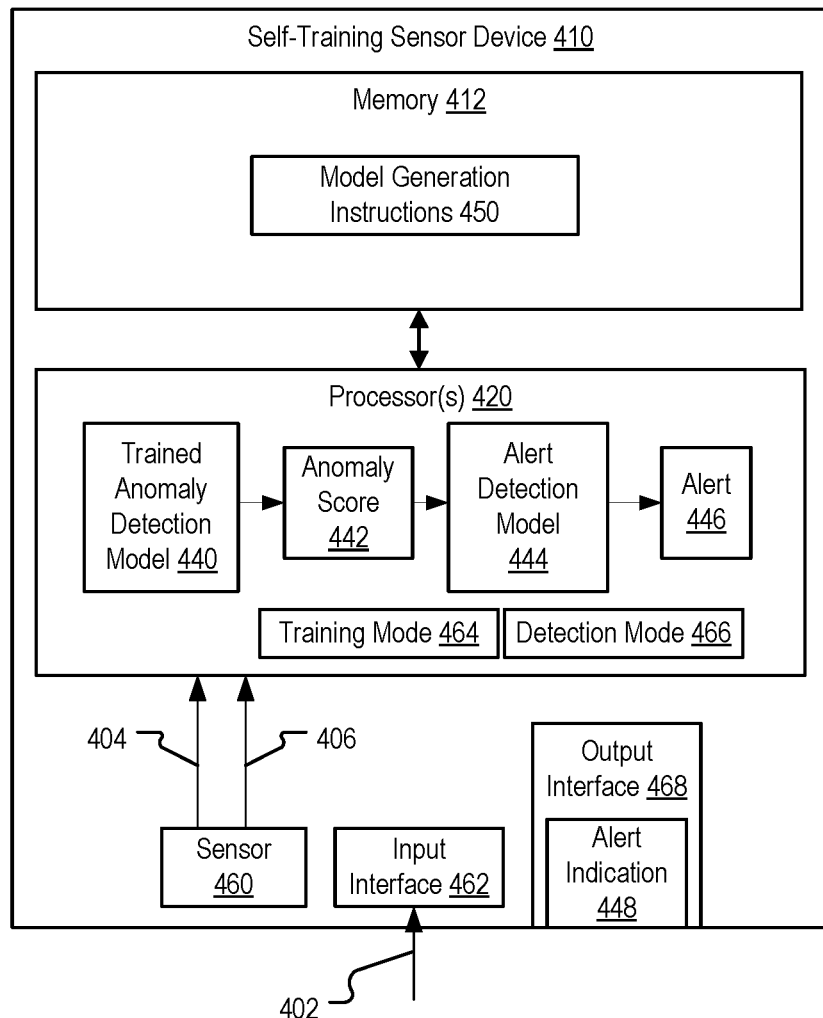
FIG. 4 is a block diagram of another particular implementation of a system that includes a trained anomaly detection model and an alert generation model for detecting anomalous operation of a rotational device in accordance with some examples of the present disclosure.

FIG. 4 depicts a particular example of a self-training sensor device 410 that includes a sensor 460, an input interface 462, a memory 412 including model generation instructions 450, one or more processors 420 coupled to the memory 412, and an output interface 468. In a particular implementation, the self-training sensor device 410 corresponds to a combination of the alert detection device 110 and the sensor device 118 in which the sensor 460, the one or more processors 420, and the memory 112 are integrated within a single device or housing.

The sensor 460 is configured to generate sensor data associated with operation of a device. In an illustrative example, the device includes a device with rotational dynamics, such as the rotational pump 106 of FIG. 1, and the sensor 460 includes at least one of a vibration sensor, a motion sensor, or an accelerometer.

The input interface 462 is configured to receive input 402 (e.g., user input) to select between a training mode 464 of operation and a detection mode 466 of operation. In some implementations, the input interface 462 includes at least one of a button, a switch, a receiver, or a touchscreen.

While operating in the training mode 464 of operation, the one or more processors 420 are configured to receive first sensor data 404 from the sensor 460 and execute the model generation instructions 450 based on the first sensor data 404 to generate a trained anomaly detection model 440 and an alert detection model 444. Before the anomaly detection model 440 is trained, the self-training sensor device 410 is agnostic of the device that the self-training sensor device 410 is coupled to (e.g., the rotational device 104). For example, in some implementations the memory 412 includes a data structure representing an autoencoder, such as the untrained autoencoder 322 of FIG. 2, and generating the trained anomaly detection model 440 includes training the autoencoder.

In a particular illustrative example, the one or more processors 420 are configured to execute the model generation instructions 450 to perform operations analogous to the operations described in FIG. 3. For example, the model generation instructions 450 may be executed to train the autoencoder based on at least a first portion of the first sensor data 404 (e.g., the first portion 312 of FIG. 3 used to train the autoencoder 202) and to generate reference residual data for the training data, to generate reference anomaly scores output by a Hotelling test statistics module based on the reference residual data and residual scores associated with a second portion of the first sensor data (e.g., the second portion 314 of FIG. 3), and to generate reference statistical data associated with the reference anomaly scores for use by a sequential probability ratio test (e.g., the reference anomaly scores 242).

While operating in the detection mode 466 of operation, the one or more processors 420 are configured to receive second sensor data 406 from the sensor 460. As the second sensor data 406 is received from the sensor 460, the one or more processors 420 use the trained anomaly detection model 440 to generate an anomaly score 442 and process the anomaly score 442 using the alert detection model 444 to determine whether to generate an alert 446. For example, the trained anomaly detection model 440 may correspond to the anomaly detection model 140 of FIG. 1 or FIG. 2, and the alert detection model 444 may correspond to the alert generation model 144 of FIG. 1 or FIG. 2.

The output interface 468 is configured to output an alert indication 448 responsive to the one or more processors 420 generating the alert 446. The output interface 468 includes at least one of a light, a buzzer, a signal port, a display device, or a transmitter configured to send a message including the alert indication via a network, as illustrative, non-limiting examples. In a particular implementation, the output interface 468 includes a transmitter configured to send the alert indication to another device to cause an alert to be output at the other device, to send the alert indication to a device (e.g., a computer) that aggregates alert indications from multiple sensor devices, or both, as illustrative, non-limiting examples.

During operation, a user may attach the self-training sensor device 410 to an industrial device with rotational dynamics exhibiting normal operation, and the user may provide the input 402 indicating the training mode 464 (e.g., by pressing a "training" button of the input interface 462). The sensor 460 begins providing the first sensor data 404 representing normal operation, and the self-training sensor device 410 executes the model generation instructions 450 to configure the trained anomaly detection model 440 and the alert detection model 444 for specific use with the rotational device based on the first sensor data 404. After configuring the trained anomaly detection model 440 and the alert detection model 444 for specific use with the attached device, the output interface 468 may present an indicator, such as a green light, to indicate that the self-training sensor device is ready for monitoring operation of the attached device.

The user may next provide input 402 indicating the detection mode 466 (e.g., by pressing a "detection" button of the input interface 462). The sensor 460 begins providing the second sensor data 406, which is processed as described with respect to the trained anomaly detection model 440 and the alert detection model 444 to determine whether to generate the alert 446. If the alert 446 is generated, such as due to detect increased amounts of power in various frequency bands of the second sensor data 406, the alert indication 448 can be output to alert a technician, or subject matter expert, that the attached device is exhibiting abnormal behavior.

Figure 5:
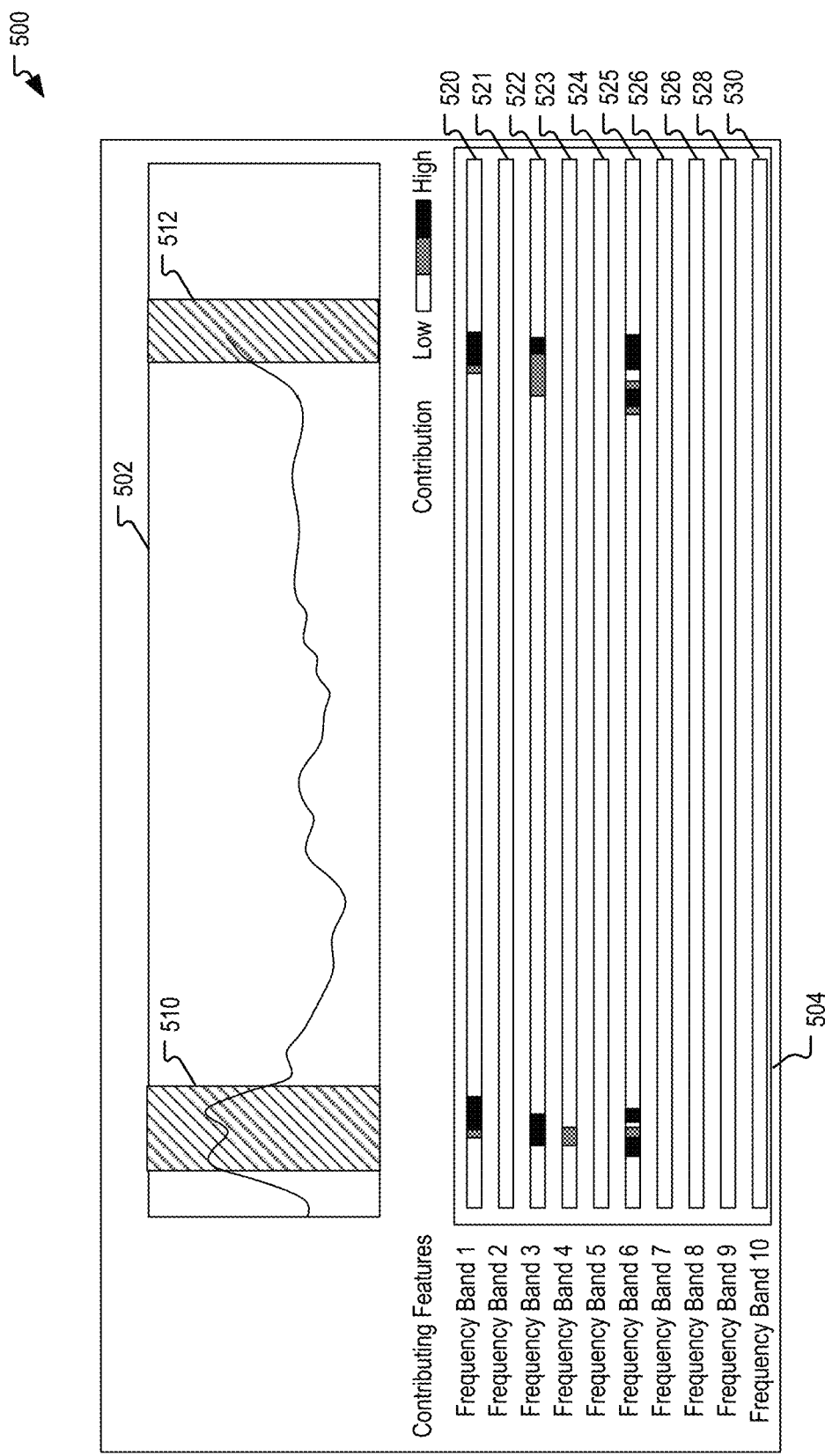
FIG. 5 is a depiction of a graphical user interface that may be generated by the system of FIG. 1 in accordance with some examples of the present disclosure.

FIG. 5 depicts an example of a graphical user interface 500, such as the graphical user interface 130 of FIG. 1 or a graphical user interface that may be displayed at a display screen of the output interface 468 of FIG. 4, as non-limiting examples. The graphical user interface 500 includes a chart 502 that illustrates values of an anomaly metric (e.g., the anomaly score 142) over a time period. As illustrated, the chart 502 also includes a first alert indication 510 and a second alert indication 512, indicating time periods during which the anomaly metric deviated sufficiently from "normal" behavior of the anomaly metric to generate an alert.

The graphical user interface 550 also includes an indication 504 of one or more sets of frequency domain data associated with the alert indication 510 and the alert indication 512. For example, a first indicator 520 extends horizontally under the chart 502 and has different visual characteristics (depicted as white, grey, or black) indicating the relative contributions of a first frequency band (of received sensor data) in determining to generate the first alert indication 510 and the second alert indication 512. Similarly, a second indicator 521 indicates the relative contributions of a second frequency band in determining to generate the first alert indication 510 and the second alert indication 512. Indicators 522-530 indicate the relative contributions of third, fourth, fifth, sixth, seventh, eighth, ninth, and tenth frequency bands, respectively, in determining to generate the first alert indication 510 and the second alert indication 512. Although ten indicators 521-530 for ten frequency bands are illustrated, in other implementations fewer than ten frequency bands or more than ten frequency bands may be used.

For example, the first alert indication 510 shows that the sixth frequency band had a high contribution at a beginning of the first alert indication 510, followed by high contributions of the first frequency band and the third frequency band, and a medium contribution of the fourth frequency band. Providing relative contributions of each frequency band to an alert determination can assist a subject matter expert to diagnose an underlying cause of abnormal behavior, to determine a remedial action to perform responsive to the alert determination, or both.

Figure 6:
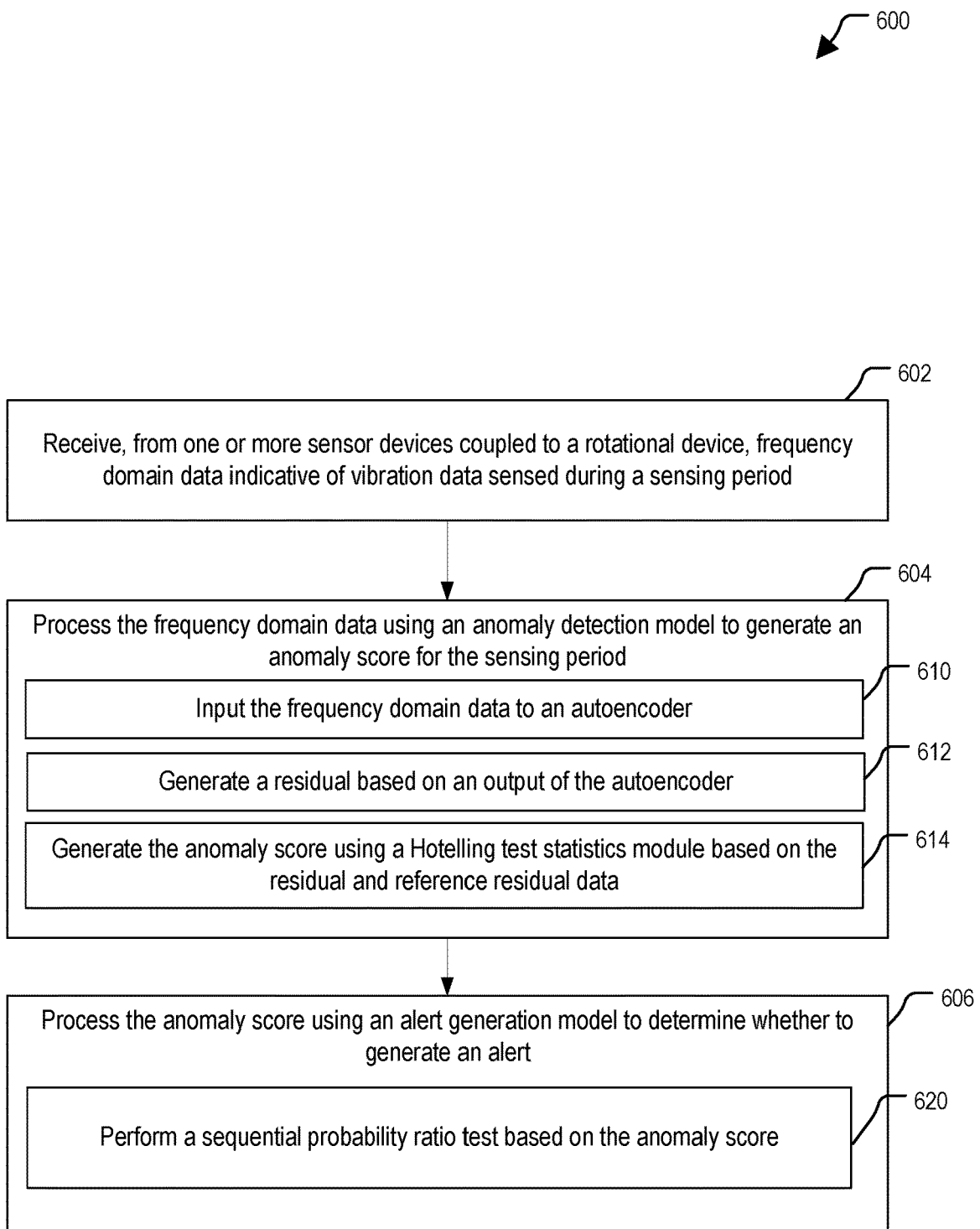
FIG. 6 is a flow chart of a method of detecting anomalous operation of a rotational device in accordance with some examples of the present disclosure.

FIG. 6 depicts a flowchart of a method 600 of detecting abnormal operation of a rotational device, such as the rotational device 104. To illustrate, the method 600 may be performed by the alert detection device 110 of FIG. 1 or the self-training sensor device 410, as non-limiting examples.

The method 600 includes, at 602, receiving, from one or more sensor devices coupled to the rotational device, frequency domain data indicative of vibration data sensed during a sensing period. For example, in some implementations, the rotational device includes a rotational pump, such as the rotational pump 106, and the one or more sensor devices (e.g., the one or more sensor devices 118 of FIG. 1 or the sensor 460 of FIG. 4) measure at least one of a motion or an acceleration associated with vibration at the rotational pump.

The method 600 includes, at 604, processing the frequency domain data using a trained anomaly detection model to generate an anomaly score for the sensing period. To illustrate, in a particular implementation, processing the frequency domain data using the trained anomaly detection model includes inputting the frequency domain data to an autoencoder (e.g., the autoencoder 202), at 610, generating a residual (e.g., the residual 232) based on an output of the autoencoder, at 612, and the anomaly score (e.g., the anomaly score 142) is generated based on the residual. For example, the anomaly score can be generated using a Hotelling test statistics module (e.g., the Hotelling test statistics module 206) based on the residual and reference residual data, at 614. To illustrate, the residual may be input to the Hotelling test statistics module, and the anomaly score may be generated at the Hotelling test statistics module using a multivariate test statistic that is based on the new residual data and the reference residual data (e.g., the reference residual data 236).

The method 600 includes, at 606, processing the anomaly score using an alert generation model to determine whether to generate an alert. To illustrate, in a particular implementation, processing the anomaly score using the alert generation model includes performing a sequential probability ratio test (e.g., the SPRT 208) based on the Hotelling $T^2$ anomaly score, at 620. In a particular example, the alert generation model includes a sequential probability ratio test that determines whether statistical data (e.g., the statistical data 240), corresponding to a set of one or more anomaly scores that includes the anomaly score, indicates deviation from a reference statistical data (e.g., the reference anomaly scores 242) corresponding to anomaly scores that are indicative of normal operation of the rotational device.

In some implementations, the method 600 also includes generating a graphical user interface to display at a display device. The graphical user interface may include a graph indicative of a performance metric of the rotational device over time, an alert indication corresponding to a portion of the graph, and an indication of one or more sets of frequency domain data associated with the alert indication, such as depicted in the graphical user interface 500 of FIG. 5.

Figure 7:
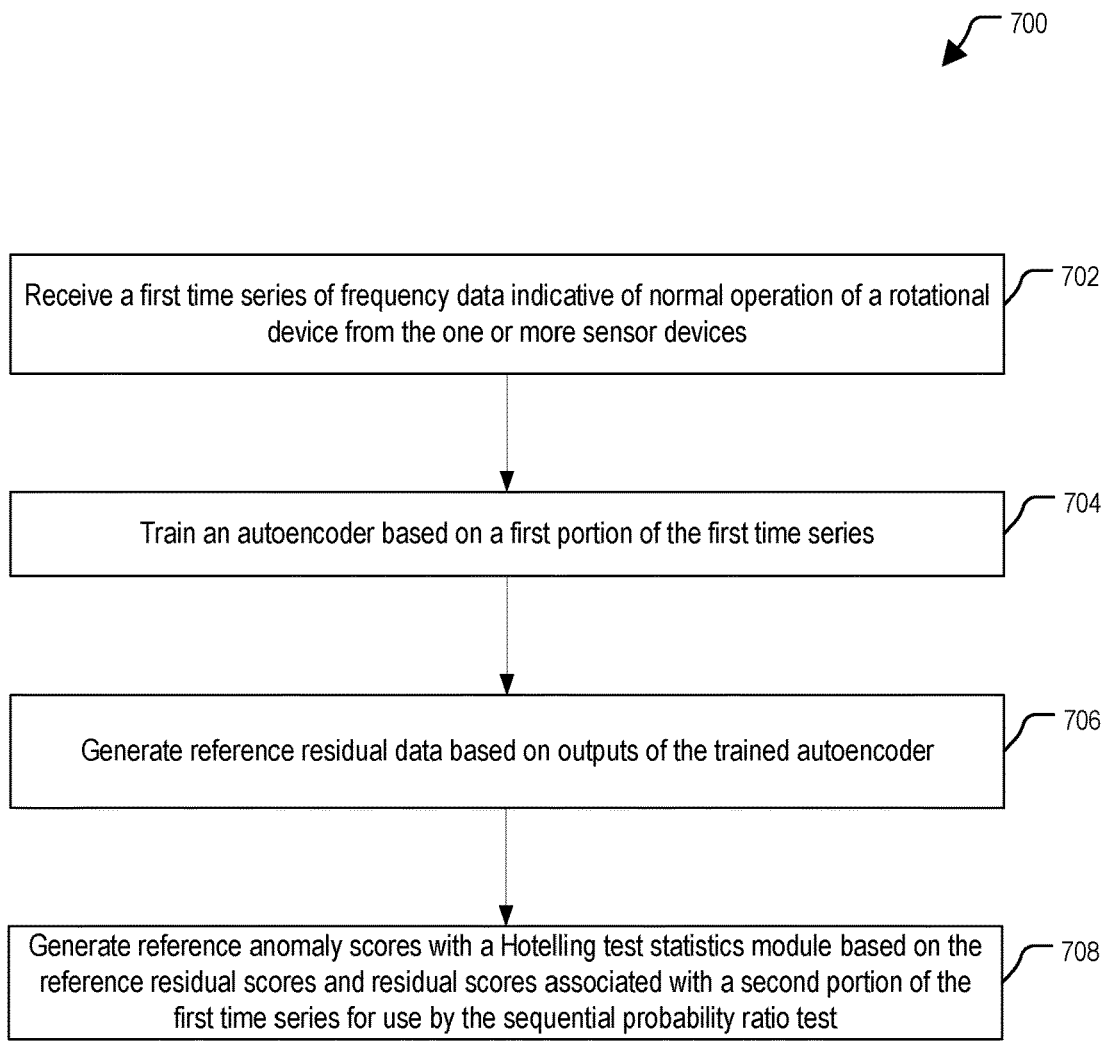
FIG. 7 is a flow chart of a method of automatically generating a model for detecting anomalous operation of a rotational device in accordance with some examples of the present disclosure.

In some implementations, the method 600 also includes performing calibration or initialization of the anomaly detection model and the alert generation model, as described further with reference to FIG. 7. For example, the method illustrated in FIG. 7 can be used to initialize (e.g., train and generate reference values for) the anomaly detection model and the alert generation model for a particular asset, and the method 600 of FIG. 6 can be performed during monitoring of the particular asset after the initialization is complete.

Thus, the method 600 enables distribution of a machine-learning type model that can be automatically trained for an individual asset (e.g., the specific rotational device 104) to distinguish between normal and abnormal operation and to generate an alert in response to detection of abnormal operation. As a result, machine-learning monitoring of a large number of relatively inexpensive assets can be deployed in a cost-effective manner.

In addition, using separate models for determining a risk score (e.g., the anomaly score) and for determining whether to generate an alert allows for on-delays, off-delays, and dynamic alerting. For example, even though the anomaly score may have a value indicative of an alert zone, the alert model may decide not to raise an alert immediately.

FIG. 7 depicts an example of a method 700 of calibrating or initializing the trained anomaly detection model and the alert generation model of FIG. 6. For example, the method 700 may be performed prior to block 602 of FIG. 6 to initialize (e.g., train and generate reference values for) the anomaly detection model and the alert generation model for a particular asset, and the method 600 of FIG. 6 can be performed during monitoring of the particular asset after the initialization is complete.

The method 700 includes, at 702, receiving a first time series of frequency domain data indicative of normal operation of the rotational device from the one or more sensor devices and, at 704, training the autoencoder based on a first portion of the first time series. For example, the first time series may correspond to the first time series 310 in the first stage 300 of FIG. 3, and the autoencoder may be trained as described with reference to the second stage 302 of FIG. 3.

The method 700 includes, at 706, generating the reference residual data based on outputs of the trained autoencoder (e.g., in the third stage 304 of FIG. 3), generating reference anomaly scores with the Hotelling test statistics module based on the reference residual data and residual scores associated with a second portion of the first time series (e.g., in the fourth stage 306 of FIG. 3), at 708, for use by the sequential probability ratio test.

Figure 8:
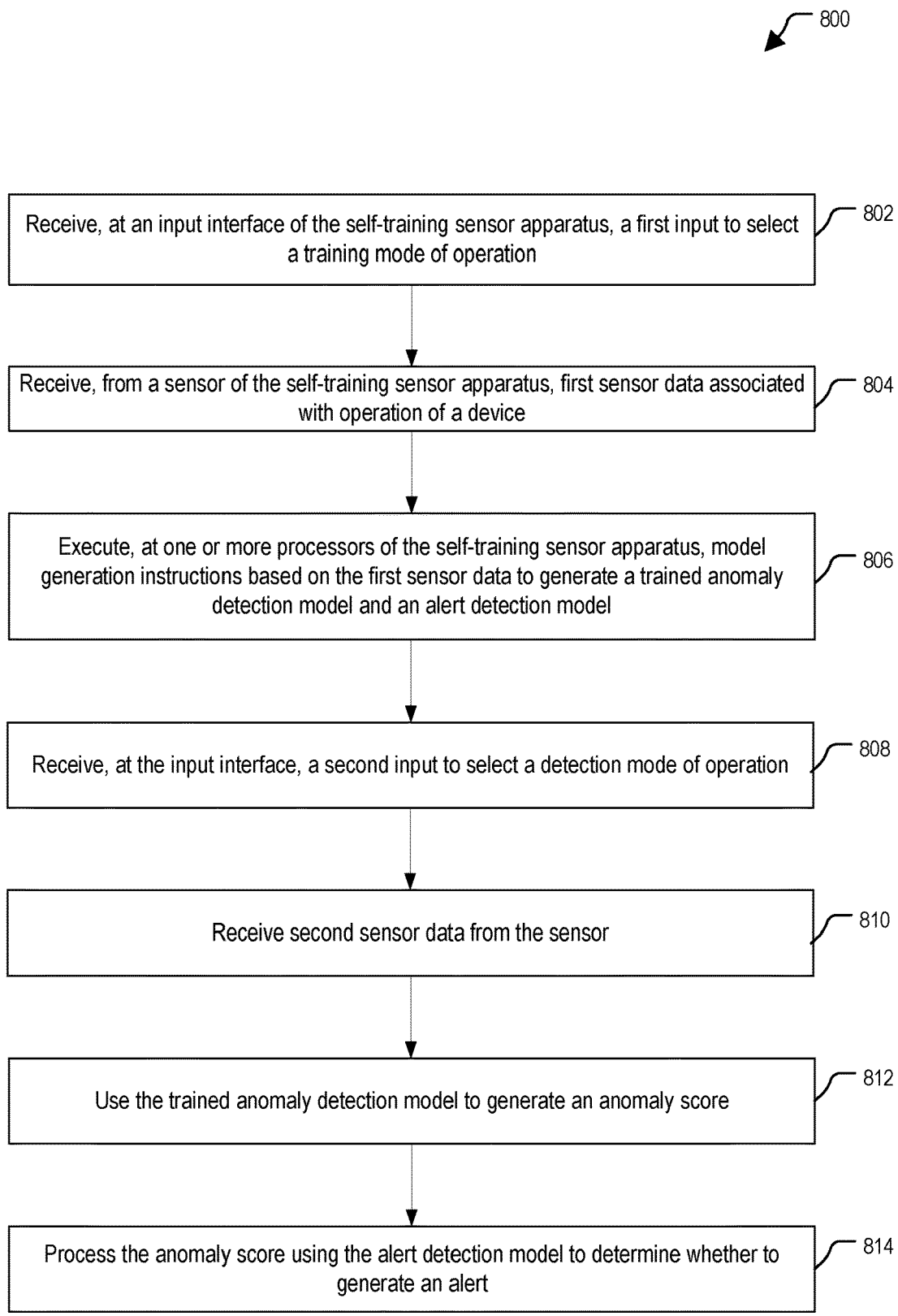
FIG. 8 is a flow chart of a method of operating a self-training sensor apparatus device in accordance with some examples of the present disclosure.

FIG. 8 depicts an example of a method 800 of operating a self-training sensor apparatus, such as the self-training sensor device 410 of FIG. 4. The method 800 includes, at 802, receiving, at an input interface of the self-training sensor apparatus, a first input to select a training mode of operation. The first input is received via at least one of a button, a switch, a receiver, or a touchscreen, as illustrative, non-limiting examples.

The method 800 includes, in response to receiving the first input, receiving, from a sensor of the self-training sensor apparatus, first sensor data (e.g., the first sensor data 404) associated with operation of a device, at 804, and executing, at one or more processors of the self-training sensor apparatus, model generation instructions (e.g., the model generation instructions 450) based on the first sensor data to generate a trained anomaly detection model and an alert detection model, at 806. In an illustrative example, before the trained anomaly detection model and the alert detection model are generated, the self-training sensor apparatus is agnostic regarding the device. In some implementations, the first sensor data includes vibration data, and the device is a rotary device, such as the rotational pump 106 of FIG. 1.

An example of executing the model generation instructions includes training an autoencoder based on at least a first portion of the first sensor data, generating reference residual data based on outputs of the autoencoder, and generating reference anomaly scores output by a Hotelling test statistics module based on the reference residual data and residual scores associated with at least a second portion of the first sensor data, for use by a sequential probability ratio test, in a similar manner as described with respect to the stages 302-306 of FIG. 3.

In some implementations, the method 800 also includes, after generating the trained anomaly detection model and the alert detection model, receiving, at the input interface, a second input to select a detection mode of operation, at 808. In response to receiving the second input, the method 800 includes receiving second sensor data (e.g., the second sensor data 406) from the sensor, at 810, using the trained anomaly detection model to generate an anomaly score, at 812, and processing the anomaly score using the alert detection model to determine whether to generate an alert, at 814.

In some implementations, the method 800 also includes, in response to a determination to generate the alert, outputting an alert indication at an output interface (e.g., the alert indication 448 at the output interface 468) of the self-training sensor apparatus. For example, outputting the alert indication may include at least one of activating a light, generating an audible signal, generating the alert indication at a signal port, or displaying the alert indication at a display device.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module or a decision model may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In conjunction with the described devices and techniques, an apparatus for detecting deviation from an operational state of a rotational device includes means for receiving, from one or more sensor devices coupled to the rotational device, frequency domain data indicative of vibration data sensed during a sensing period. For example, the means for receiving can correspond to the receiver 122, one or more other circuits or devices to receive frequency domain data from one or more sensor devices, or any combination thereof.

The apparatus includes means for generating an anomaly score for the sensing period based on the frequency domain data. For example, the means for generating the anomaly score can correspond to the anomaly detection model 104. In some implementations, the one or more processors 120 execute the anomaly detection model 104 to: sequentially input each sequential value of a portion of the frequency domain into an autoencoder to generate a sequence of reconstructed values; generate residual data by computing a difference between each of the reconstructed values and the corresponding input value (e.g., by subtraction); and performing a Hotelling $T^2$ test, using the residual data as samples of a first distribution and reference residual data corresponding to a second distribution. The resulting Hotelling T² statistic may be used as the anomaly score or may be used as a basis to compute the anomaly score (e.g., scaled, normalized, quantized, etc.).

The apparatus also includes means for determining, based on the anomaly score, whether to generate an alert. For example, the means for determining whether to generate an alert can correspond to the alert generation model 144. In some implementations, the one or more processors 120 execute the alert generation model 144 to generate statistical data (e.g., mean and variance) from a set of sequentially generated anomaly scores, and to perform a sequential probability ratio test to determine whether the statistical data continues to follow, or no longer follows, a behavior statistic of reference anomaly scores.

In some implementations, the means for generating the anomaly score includes means for generating a reconstruction of the frequency domain data and means for generating a residual based on a difference between input frequency domain data and the reconstruction of the input frequency domain data. For example, the means for generating the reconstruction of the frequency domain data can include the autoencoder 202. In some implementations, the one or more processors 120 execute the autoencoder 202 to receive input data, process the input data via one or more layers of a neural network to generate a dimensionally reduced representation of the data at a latent space layer, and process the dimensionally reduced representation via one or more layers to output a reconstruction of the input data. The means for generating the residual can include the residual generator 204. In some implementations, the one or more processors 120 execute the residual generator 204 to receive a sequence of the reconstructed values and to generate residual data by computing a difference between each of the reconstructed values and the corresponding input value (e.g., by subtraction).

In some implementations, the means for determining whether to generate the alert includes means for performing a sequential probability ratio test. In some implementations, the one or more processors 120 execute the SPRT 208 to perform a sequential probability ratio test to determine whether the statistical data 240 of the set of anomaly scores 238 continues to follow, or no longer follows, the normal behavior statistics of the reference anomaly scores 242.

Particular aspects of the disclosure are described below in the following clauses:

According to a clause 1, a method of detecting deviation from an operational state of a rotational device includes receiving, from one or more sensor devices coupled to the rotational device, frequency domain data indicative of vibration data sensed during a sensing period, processing the frequency domain data using a trained anomaly detection model to generate an anomaly score for the sensing period, and processing the anomaly score using an alert generation model to determine whether to generate an alert.

Clause 2 includes the method of clause 1, wherein the rotational device includes a rotational pump, and wherein the one or more sensor devices measure at least one of a motion or an acceleration associated with vibration at the rotational pump.

Clause 3 includes the method of clause 1, wherein processing the frequency domain data using the trained anomaly detection model includes inputting the frequency domain data to an autoencoder, generating a residual based on an output of the autoencoder, and generating the anomaly score using a Hotelling test statistics module based on the residual and reference residual data, and processing the anomaly score using the alert generation model includes performing a sequential probability ratio test based on the anomaly score.

Clause 4 includes the method of clause 3, further including, prior to receiving the frequency domain data. receiving a first time series of frequency domain data indicative of normal operation of the rotational device from the one or more sensor devices, and training the autoencoder based on the first time series.

Clause 5 includes the method of clause 1, further including, prior to receiving the frequency domain data: receiving a first time series of frequency domain data indicative of normal operation of the rotational device from the one or more sensor devices; training an autoencoder of the anomaly detection model based on a first portion of the first time series; generating reference residual data based on outputs of the trained autoencoder; and generating reference anomaly scores at a Hotelling test statistics module based on the reference residual data and residual scores associated with a second portion of the first time series for use by a sequential probability ratio test of the alert generation model.

Clause 6 includes the method of clause 1, wherein processing the frequency domain data at the trained anomaly detection model includes inputting the frequency domain data to an autoencoder and generating a residual based on an output of the autoencoder, wherein the anomaly score is generated based on the residual.

Clause 7 includes the method of clause 6, wherein processing the frequency domain data at the trained anomaly detection model further includes inputting the residual to a Hotelling test statistics module and generating the anomaly score.

Clause 8 includes the method of clause 6, wherein the alert generation model includes a sequential probability ratio test that determines whether a set of one or more anomaly scores indicates deviation from normal operation of the rotational device.

Clause 9 includes the method of clause 1, further including generating a graphical user interface including a graph indicative of a performance metric of the rotational device over time, an alert indication corresponding to a portion of the graph, and an indication of one or more sets of frequency domain data associated with the alert indication.

According to a clause 10, a system to detect deviation from an operational state of a vibrating device includes a memory including a trained anomaly detection model and an alert generation model and one or more processors coupled to the memory, the one or more processors configured to process, using the trained anomaly detection model, frequency domain data indicative of vibration data sensed during a sensing period, the trained anomaly detection model configured to generate an anomaly score for the sensing period and process the anomaly score using an alert generation model to determine whether to generate an alert.

Clause 11 includes the system of clause 10, further comprising one or more sensor devices, the one or more sensor devices including one or more sensors configured to generate the vibration data and a data processor configured to output the frequency domain data based on the vibration data.

Clause 12 includes the system of clause 10, wherein the trained anomaly detection model includes an autoencoder configured to generate a reconstruction of the frequency domain data, a residual generator configured to generate a residual based on a difference between the reconstruction and the frequency domain data, and a Hotelling test statistics module configured to generate the anomaly score based on the residual and reference residual data.

Clause 13 includes the system of clause 12, wherein the alert generation model includes a sequential probability ratio test configured to determine whether a set of anomaly scores indicates deviation from normal operation of the vibrating device.

Clause 14 includes the system of clause 13, wherein the vibrating device includes a rotational device, and wherein the memory further includes a calibration module that is executable by the one or more processors to train the autoencoder based on a first portion of a first time series of frequency data indicative of normal operation of the rotational device, generate the reference residual data based on outputs of the trained autoencoder, and generate reference anomaly scores based on the reference residual data and residual scores associated with a second portion of the first time series for use by the sequential probability ratio test.

Clause 15 includes the system of clause 10, wherein the memory further includes a graphical user interface module that is executable by the one or more processors to generate a graphical user interface to display an alert indication.

Clause 16 includes the system of clause 15, further comprising a display device coupled to the one or more processors and configured to display the graphical user interface, wherein the graphical user interface includes the alert indication and an indication of one or more sets of frequency domain data associated with the alert indication.

Clause 17 includes the system of clause 10, further comprising a receiver configured to receive the frequency domain data from one or more sensor devices that are configured to detect vibrations of a rotational device.

A clause 18 includes computer-readable storage device storing instructions that, when executed by one or more processors, cause the one or more processors to receive, from one or more sensor devices coupled to a rotational device, frequency domain data indicative of vibration data sensed during a sensing period, process the frequency domain data using a trained anomaly detection model to generate an anomaly score for the sensing period, and process the anomaly score using an alert generation model to determine whether to generate an alert.

Clause 19 includes the computer-readable storage device of clause 18, wherein the instructions are executable to further cause the one or more processors to process the frequency domain data using the trained anomaly detection model by inputting the frequency domain data to an autoencoder, generating a residual based on an output of the autoencoder, and generating the anomaly score using a Hotelling test statistics module based on the residual and reference residual data, and process the anomaly score using the alert generation model by performing a sequential probability ratio test based on the anomaly score.

According to a clause 20, an apparatus for detecting deviation from an operational state of a rotational device includes means for receiving, from one or more sensor devices coupled to the rotational device, frequency domain data indicative of vibration data sensed during a sensing period, means for generating an anomaly score for the sensing period based on the frequency domain data, and means for determining, based on the anomaly score, whether to generate an alert.

Clause 21 includes the apparatus of clause 20, wherein the means for generating the anomaly score includes means for generating a reconstruction of the frequency domain data and means for generating a residual based on a difference between input frequency domain data and the reconstruction of the input frequency domain data, and the means for determining whether to generate the alert includes means for performing a sequential probability ratio test.

According to a clause 22, a self-training sensor apparatus includes a sensor to generate sensor data associated with operation of a device, an input interface to receive input to select between a training mode of operation and a detection mode of operation, a memory including model generation instructions, one or more processors coupled to the memory, the one or more processors configured to, while operating in the training mode of operation, receive first sensor data from the sensor and execute the model generation instructions based on the first sensor data to generate a trained anomaly detection model and an alert detection model, and while operating in the detection mode of operation, receive second sensor data from the sensor, use the trained anomaly detection model to generate an anomaly score, and process the anomaly score using the alert detection model to determine whether to generate an alert, and an output interface to output an alert indication responsive to the one or more processors generating the alert.

Clause 23 includes the self-training sensor apparatus of clause 22, wherein the sensor includes at least one of a vibration sensor, a motion sensor, or an accelerometer.

Clause 24 includes the self-training sensor apparatus of clause 22, wherein the input interface includes at least one of a button, a switch, a receiver, or a touchscreen.

Clause 25 includes the self-training sensor apparatus of clause 22, wherein the device includes a rotary device.

Clause 26 includes the self-training sensor apparatus of clause 22, wherein the sensor, the one or more processors, and the memory are integrated within a single device or housing.

Clause 27 includes the self-training sensor apparatus of clause 22, wherein before the anomaly detection model is trained, the apparatus is agnostic regarding the device.

Clause 28 includes the self-training sensor apparatus of clause 22, wherein the memory includes a data structure representing an autoencoder, and wherein generating the trained anomaly detection model includes training the autoencoder.

Clause 29 includes the self-training sensor apparatus of clause 22, wherein the one or more processors are configured to execute the model generation instructions to train an autoencoder based on at least a first portion of the first sensor data, generate reference residual data based outputs of the trained autoencoder, and generate reference anomaly scores output by a Hotelling test statistics module based on the reference residual data and residual scores associated with at least a second portion of the first sensor data for use by a sequential probability ratio test.

Clause 30 includes the self-training sensor apparatus of clause 22, wherein the output interface includes at least one of a light, a buzzer, a signal port, a display device, or a transmitter configured to send a message including the alert indication via a network.

A clause 31 includes a method of operating a self-training sensor apparatus, the method comprising receiving, at an input interface of the self-training sensor apparatus, a first input to select a training mode of operation, and in response to receiving the first input, receiving, from a sensor of the self-training sensor apparatus, first sensor data associated with operation of a device, and executing, at one or more processors of the self-training sensor apparatus, model generation instructions based on the first sensor data to generate a trained anomaly detection model and an alert detection model.

Clause 32 includes the method of clause 31, further comprising, after generating the trained anomaly detection model and the alert detection model, receiving, at the input interface, a second input to select a detection mode of operation, and in response to receiving the second input, receiving second sensor data from the sensor, using the trained anomaly detection model to generate an anomaly score, and processing the anomaly score using the alert detection model to determine whether to generate an alert.

Clause 33 includes the method of clause 32, further comprising, in response to a determination to generate the alert, outputting an alert indication at an output interface of the self-training sensor apparatus.

Clause 34 includes the method of clause 33, wherein outputting the alert indication includes at least one of activating a light, generating an audible signal, generating the alert indication at a signal port, or displaying the alert indication at a display device.

Clause 35 includes the method of clause 31, wherein the first sensor data includes at least one of vibration data, motion data, or acceleration data.

Clause 36 includes the method of clause 31, wherein the first input is received via at least one of a button, a switch, a receiver, or a touchscreen.

Clause 37 includes the method of clause 31, wherein the device includes a rotary device.

Clause 38 includes the method of clause 31, wherein before the trained anomaly detection model and the alert detection model are generated, the self-training sensor apparatus is agnostic of the device.

Clause 39 includes the method of clause 31, wherein executing the model generation instructions includes training an autoencoder based on at least a first portion of the first sensor data, generating reference residual data based on an output of the trained autoencoder, and generating reference anomaly scores output by a Hotelling test statistics module based on the reference residual data and residual scores associated with at least a second portion of the first sensor data for use by a sequential probability ratio test.

Although the disclosure may include one or more methods, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. To illustrate, although anomaly scores are described as generated based on Hotelling test statistics, in other implementations other techniques to generate anomaly scores based on residuals may be used. As another example, although alert generation is described as using SPRT, in other implementations other techniques to generate alerts based on anomaly scores may be used. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method of detecting deviation from an operational state of a rotational device, the method comprising:
   receiving, from one or more sensor devices coupled to the rotational device, frequency domain data indicative of vibration data sensed during a sensing period;
   processing the frequency domain data using a trained anomaly detection model to generate an anomaly score for the sensing period, wherein processing the frequency domain data comprises:
      inputting the frequency domain data to an autoencoder; and
      generating a residual based on an output of the autoencoder and the frequency domain data, wherein the anomaly score is based on the residual; and
   processing the anomaly score using an alert generation model to determine whether to generate an alert.

2. The method of claim 1, wherein the rotational device includes a rotational pump, and wherein the one or more sensor devices measure at least one of a motion or an acceleration associated with vibration at the rotational pump.

3. The method of claim 1, wherein the alert generation model is configured to determine whether to generate an alert based on a plurality of anomaly scores including the anomaly score.

4. The method of claim 1, wherein the alert generation model is configured to determine whether to generate an alert based on a degree of deviation from a normal deviation in a particular time period.

5. The method of claim 1, further comprising, prior to receiving the frequency domain data:
   receiving a first time series of frequency domain data indicative of normal operation of the rotational device from the one or more sensor devices;
   training the autoencoder of the anomaly detection model based on a first portion of the first time series;
   generating reference residual data based on outputs of the trained autoencoder; and
   generating reference anomaly scores at a Hotelling test statistics module based on the reference residual data and residual scores associated with a second portion of the first time series for use by a sequential probability ratio test of the alert generation model.

6. The method of claim 5, wherein the reference anomaly scores include mean values and variance values.

7. The method of claim 1, wherein processing the frequency domain data at the trained anomaly detection model further includes:
   inputting the residual to a statistics module; and
   generating the anomaly score at the statistics module using a multivariate test statistic that is based on residual data and reference residual data.

8. The method of claim 1, wherein the alert generation model is configured to determine whether a set of one or more anomaly scores indicates deviation from normal operation of the rotational device.

9. The method of claim 1, further comprising generating a graphical user interface including:

a graph indicative of a performance metric of the rotational device over time;
an alert indication corresponding to a portion of the graph; and
an indication of one or more sets of frequency domain data associated with the alert indication.

10. A system to detect deviation from an operational state of a vibrating device, the system comprising:
a memory including a trained anomaly detection model and an alert generation model; and
one or more processors coupled to the memory, the one or more processors configured to:
process, using the trained anomaly detection model, frequency domain data indicative of vibration data sensed during a sensing period, the trained anomaly detection model configured to generate an anomaly score for the sensing period, wherein processing the frequency domain data comprises:
inputting the frequency domain data to an autoencoder; and
generating a residual based on an output of the autoencoder and the frequency domain data, wherein the anomaly score is based on the residual; and
process the anomaly score using an alert generation model to determine whether to generate an alert.

11. The system of claim 10, further comprising one or more sensor devices, the one or more sensor devices including:
one or more sensors configured to generate the vibration data; and
a data processor configured to output the frequency domain data based on the vibration data.

12. The system of claim 10, wherein the trained anomaly detection model includes:
the autoencoder, wherein the autoencoder is configured to generate a reconstruction of the frequency domain data;
a residual generator configured to generate the residual; and
a statistics module configured to generate the anomaly score based on the residual and reference residual data.

13. The system of claim 12, wherein the alert generation model is configured to determine whether a set of anomaly scores indicates deviation from normal operation of the vibrating device.

14. The system of claim 13, wherein the vibrating device includes a rotational device, and wherein the memory further includes a calibration module that is executable by the one or more processors to:
train the autoencoder based on a first portion of a first time series of frequency data indicative of normal operation of the rotational device;
generate the reference residual data based on outputs of the trained autoencoder; and
generate reference anomaly scores based on the reference residual data and residual scores associated with a second portion of the first time series.

15. The system of claim 10, wherein the memory further includes a graphical user interface module that is executable by the one or more processors to generate a graphical user interface to display an alert indication.

16. The system of claim 15, further comprising a display device coupled to the one or more processors and configured to display the graphical user interface, wherein the graphical user interface includes:
the alert indication; and
an indication of one or more sets of frequency domain data associated with the alert indication.

17. The system of claim 10, further comprising a receiver configured to receive the frequency domain data from one or more sensor devices that are configured to detect vibrations of a rotational device.

18. A computer-readable storage device storing instructions that, when executed by one or more processors, cause the one or more processors to:
receive, from one or more sensor devices coupled to a rotational device, frequency domain data indicative of vibration data sensed during a sensing period;
process the frequency domain data using a trained anomaly detection model to generate an anomaly score for the sensing period, wherein processing the frequency domain data comprises:
inputting the frequency domain data to an autoencoder; and
generating a residual based on an output of the autoencoder and the frequency domain data, wherein the anomaly score is based on the residual; and
process the anomaly score using an alert generation model to determine whether to generate an alert.

19. The computer-readable storage device of claim 18, wherein the instructions are executable to further cause the one or more processors to:
process the frequency domain data using the trained anomaly detection model by generating the anomaly score using a statistics module based on the residual and reference residual data; and
process the anomaly score using the alert generation model.

20. An apparatus for detecting deviation from an operational state of a rotational device, the apparatus comprising:
means for receiving, from one or more sensor devices coupled to the rotational device, frequency domain data indicative of vibration data sensed during a sensing period;
means for generating an anomaly score for the sensing period based on the frequency domain data, wherein the means for generating the anomaly score includes:
means for generating a reconstruction of the frequency domain data; and
means for generating a residual based on a difference between the frequency domain data and the reconstruction of the frequency domain data, wherein the anomaly score is based on the residual; and
means for determining, based on the anomaly score, whether to generate an alert.

21. The apparatus of claim 20, wherein the means for determining whether to generate the alert includes means for determining whether a set of one or more anomaly scores indicates deviation from normal operation of the rotational device.

22. A self-training sensor apparatus comprising:
a sensor to generate sensor data associated with operation of a device;
an input interface to receive input to select between a training mode of operation and a detection mode of operation;
a memory including model generation instructions;
one or more processors coupled to the memory, the one or more processors configured to:
while operating in the training mode of operation, receive first sensor data from the sensor and execute the model generation instructions based on the first sensor data to generate a trained anomaly detection model and an alert detection model, wherein the trained anomaly detection model includes a data structure representing an autoencoder; and while operating in the detection mode of operation:
receive second sensor data from the sensor;
use the trained anomaly detection model to generate an anomaly score by:
inputting the second sensor data to the autoencoder; and
generating a residual based on an output of the autoencoder and the second sensor data, wherein the anomaly score is based on the residual; and
process the anomaly score using the alert detection model to determine whether to generate an alert; and an output interface to output an alert indication responsive to the one or more processors generating the alert.

23. The self-training sensor apparatus of claim 22, wherein the sensor includes at least one of a vibration sensor, a motion sensor, or an accelerometer.

24. The self-training sensor apparatus of claim 22, wherein the input interface includes at least one of a button, a switch, a receiver, or a touchscreen.

25. The self-training sensor apparatus of claim 22, wherein the device includes a rotary device.

26. The self-training sensor apparatus of claim 22, wherein the sensor, the one or more processors, and the memory are integrated within a single device or housing.

27. The self-training sensor apparatus of claim 22, wherein before the anomaly detection model is trained, the apparatus is agnostic regarding the device.

28. The self-training sensor apparatus of claim 22, wherein generating the trained anomaly detection model includes training the autoencoder.

29. The self-training sensor apparatus of claim 22, wherein the one or more processors are configured to execute the model generation instructions to:
train the autoencoder based on at least a first portion of the first sensor data;
generate reference residual data based on outputs of the trained autoencoder; and
generate reference anomaly scores output by a statistics module based on the reference residual data and residual scores associated with at least a second portion of the first sensor data.

30. The self-training sensor apparatus of claim 22, wherein the output interface includes at least one of a light, a buzzer, a signal port, a display device, or a transmitter configured to send a message including the alert indication via a network.

31. A method of operating a self-training sensor apparatus, the method comprising:
receiving, at an input interface of the self-training sensor apparatus, a first input to select a training mode of operation; and
in response to receiving the first input:
receiving, from a sensor of the self-training sensor apparatus, first sensor data associated with operation of a device; and
executing, at one or more processors of the self-training sensor apparatus, model generation instructions based on the first sensor data to generate a trained anomaly detection model and an alert detection model, including:
training an autoencoder based on at least a first portion of the first sensor data; and
generating reference residual data based on outputs of the trained autoencoder and the first portion of the first sensor data, wherein the alert detection model is generated based on reference residual data.

32. The method of claim 31, further comprising, after generating the trained anomaly detection model and the alert detection model:
receiving, at the input interface, a second input to select a detection mode of operation; and
in response to receiving the second input:
receiving second sensor data from the sensor;
using the trained anomaly detection model to generate an anomaly score; and
processing the anomaly score using the alert detection model to determine whether to generate an alert, including:
inputting the second sensor data to an autoencoder; and
generating a residual based on an output of the autoencoder and the second sensor data, wherein the anomaly score is based on the residual.

33. The method of claim 32, further comprising, in response to a determination to generate the alert, outputting an alert indication at an output interface of the self-training sensor apparatus.

34. The method of claim 33, wherein outputting the alert indication includes at least one of activating a light, generating an audible signal, generating the alert indication at a signal port, or displaying the alert indication at a display device.

35. The method of claim 31, wherein the first sensor data includes at least one of vibration data, motion data, or acceleration data.

36. The method of claim 31, wherein the first input is received via at least one of a button, a switch, a receiver, or a touchscreen.

37. The method of claim 31, wherein the device includes a rotary device.

38. The method of claim 31, wherein before the trained anomaly detection model and the alert detection model are generated, the self-training sensor apparatus is agnostic of the device.

39. The method of claim 31, wherein executing the model generation instructions includes generating reference anomaly scores output by a statistics module based on the reference residual data and residual scores associated with at least a second portion of the first sensor data.

* * * * *